United States Patent
Tatsuno et al.

(10) Patent No.: US 7,398,648 B2
(45) Date of Patent: Jul. 15, 2008

(54) TRAVEL CONTROL DEVICE FOR HYDRAULICALLY DRIVEN VEHICLE AND HYDRAULICALLY DRIVEN VEHICLE

(75) Inventors: Yukihiro Tatsuno, Tsuchiura (JP); Kazuhiro Ichimura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 142 days.

(21) Appl. No.: 10/573,757

(22) PCT Filed: Sep. 17, 2004

(86) PCT No.: PCT/JP2004/013628

§ 371 (c)(1),
(2), (4) Date: Mar. 29, 2006

(87) PCT Pub. No.: WO2005/033557

PCT Pub. Date: Apr. 14, 2005

(65) Prior Publication Data

US 2007/0119163 A1 May 31, 2007

(30) Foreign Application Priority Data

Sep. 30, 2003 (JP) ............................. 2003-339859

(51) Int. Cl.
*F15B 11/02* (2006.01)
*F16H 61/46* (2006.01)

(52) U.S. Cl. .............................. 60/448; 60/431; 60/449

(58) Field of Classification Search .................. 60/431, 60/445, 448, 449

See application file for complete search history.

(56) References Cited

U.S. PATENT DOCUMENTS

| 5,709,282 | A * | 1/1998 | Akira et al. | 60/445 |
|---|---|---|---|---|
| 6,182,448 | B1 * | 2/2001 | Ohkura et al. | 60/445 |
| 6,912,803 | B2 * | 7/2005 | Ichimura | 60/420 |
| 6,941,688 | B2 * | 9/2005 | Ichimura et al. | 60/490 |
| 2003/0140530 | A1 | 7/2003 | Ichimura et al. | |

FOREIGN PATENT DOCUMENTS

JP          5-10165 A          1/1993

(Continued)

OTHER PUBLICATIONS

International Search Report dated Nov. 22, 2004 (two (2) page).

*Primary Examiner*—Thomas E Lazo
(74) *Attorney, Agent, or Firm*—Crowell & Moring LLP (57) ABSTRACT

The present invention includes a hydraulic pump 10 driven by a prime mover 1, a traveling motor 12 driven with pressure oil delivered from the hydraulic pump 10, a control valve 11 for traveling that controls a flow rate of the pressure oil delivered from the hydraulic pump 10 to the traveling motor 12, a counterbalance valve 13 switched in response to a motor load pressure supplied via the control valve 11, that generates a braking pressure at a conduit L1A or L1B disposed on a return side of the traveling motor 12 as the load pressure becomes lower, an overspeed detection means 42 for detecting an overspeed state in the traveling motor 12, and a motor overspeed inhibiting means 50 for inhibiting rotation of the traveling motor 12 if the overspeed detection means 42 detects an overspeed state in the traveling motor 12 until a braking pressure is generated through a switchover at the counterbalance valve 13 and the traveling motor 12 is no longer in the overspeed state.

7 Claims, 10 Drawing Sheets

FOREIGN PATENT DOCUMENTS

| | | |
|---|---|---|
| JP | 8-270788 A | 10/1996 |
| JP | 11-236968 A | 8/1999 |
| JP | 2002-81540 A | 3/2002 |
| JP | 2002-130004 A | 5/2002 |
| WO | WO 02/057662 A1 | 7/2002 |
| WO | WO 200257662 A1 * | 7/2002 |

* cited by examiner

TRAVEL CONTROL DEVICE FOR HYDRAULICALLY DRIVEN VEHICLE AND HYDRAULICALLY DRIVEN VEHICLE

TECHNICAL FIELD

The present invention relates to a travel control device for a hydraulically driven vehicle such as a wheel hydraulic excavator and a hydraulically driven vehicle.

BACKGROUND ART

There are hydraulically driven vehicles known in the related art such as wheel hydraulic excavators, driven to travel by a driving motor that, in turn, is driven on pressure oil delivered from a hydraulic pump driven by a prime mover, the flow rate and the direction of which are controlled through a control valve (see, for instance, patent reference literature 1). In this type of vehicle, the control valve is switched by stepping on an accelerator pedal, and as the load pressure at the traveling motor increases, the motor speed is controlled by increasing the displacement of the traveling motor. In addition, a counterbalance valve is disposed at a conduit connecting the control valve to the traveling motor and by switching the counterbalance valve to the neutral position as the motor drive pressure becomes lowered, a braking pressure is generated at the conduit disposed on the output side of the traveling motor, thereby inhibiting the motor from overspeeding while the vehicle travels downhill or the like.
Patent reference literature 1: Japanese Laid Open Patent Publication No. H8-270788

DISCLOSURE OF THE INVENTION

Problems to be Solved by the Invention

The device disclosed in the publication mentioned above switches the counterbalance valve to the neutral. position as the vehicle shifts from a level ground traveling operation to a downhill traveling operation and the motor load pressure decreases, thereby generating a braking pressure at the conduit disposed on the output side of the motor. However, the counterbalance valve is switched with a response delay, and for this reason, the motor may run overspeed following the start of the downhill traveling operation until the counterbalance valve takes effect, which may reduce the service life of the motor.

Means for Solving the Problems

A travel control device for a hydraulically driven vehicle according to the present invention includes a hydraulic pump driven by a prime mover, a traveling motor driven with pressure oil delivered from the hydraulic pump, a control valve for traveling that controls a flow rate of the pressure oil delivered from the hydraulic pump to the traveling motor, a counterbalance valve switched in response to a motor load pressure supplied via the control valve, that generates a braking pressure at a conduit disposed on a return side of the traveling motor as the load pressure becomes lower, an overspeed detection means for detecting an overspeed state in the traveling motor, and a motor overspeed inhibiting means for inhibiting rotation of the traveling motor if the overspeed detection means detects an overspeed state in the traveling motor until a braking pressure is generated through a switchover at the counterbalance valve and the traveling motor is no longer in the overspeed state.

A rotation speed of the traveling motor may be detected so as to detect the overspeed state when the motor rotation speed is equal to or greater than a predetermined value. Alternatively, an acceleration of the traveling motor maybe detected so as to detect the overspeed state when the motor speed is equal to or higher than a specific level and the motor acceleration is equal to or greater than a predetermined value.

In this case, it is preferable to reduce a rotation speed of the prime mover to a greater extent when the detected motor rotation speed or motor acceleration is at a higher level. Alternatively, the hydraulic pump may be configured to be a variable displacement hydraulic pump so as to reduce a displacement angle of the hydraulic pump to a greater extent when the detected motor rotation speed or motor acceleration is at a higher level.

It is preferable for a hydraulically driven to be equipped with a drive control device described above.

Effect of the Invention

According to the present invention, if the traveling motor is detected to be in an overspeed state, the rotation speed of the traveling motor is reduced until the braking pressure generated by switching the counterbalance valve cancels the overspeed state. Thus, even when there is a response delay at the counterbalance valve, the motor rotation speed can be kept down to a level equal to or less than the allowable rotation speed and consequently, the motor service life is not reduced.

EXPLANATION OF REFERENCE NUMERALS 1 engine
10 hydraulic pump
10A pump regulator
11 travel control valve
12 traveling hydraulic motor
13 counterbalance valve
31 solenoid proportional valve
42 rotation speed sensor
50 controller 53 pulse motor
54 potentiometer
L1A, L1B main conduit

BEST MODE FOR CARRYING OUT THE INVENTION

First Embodiment

The first embodiment of a travel control device according to the present invention is now explained in reference to FIGS. 1 through 8.

Figure 1:
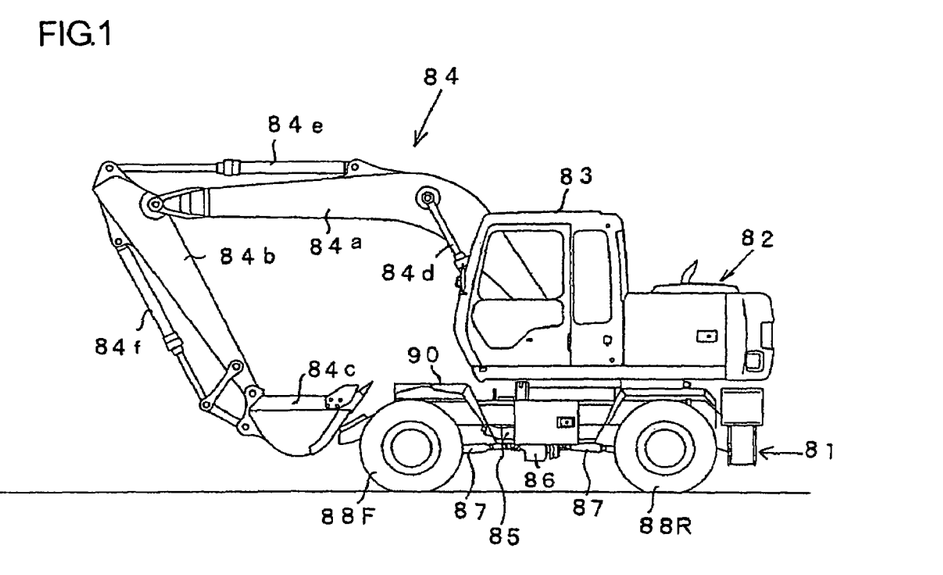
FIG. 1 is a side elevation of a wheel hydraulic excavator in which the present invention may be adopted.

FIG. 1 shows a wheel hydraulic excavator in which the present invention may be adopted. This wheel hydraulic excavator includes a traveling undercarriage 81 and an upper revolving superstructure 82 rotatably mounted atop the traveling undercarriage 81. A driver's cab 83 and a front work attachment 84 are disposed at the upper revolving superstructure 82. The front attachment 84 includes a boom 84a rotatably linked to the body of the upper revolving superstructure 82, an arm 84b rotatably linked to the boom 84a and a bucket 84c rotatably linked to the arm 84b. The boom 84a is elevated and lowered with a boom cylinder 84d, the arm 84b is elevated and lowered with an arm cylinder 84e and the bucket 84c is engaged in digging and dumping operations with a bucket cylinder 84f. A traveling hydraulic motor 85, a transmission 86 and a propeller shaft 87 are disposed at the traveling undercarriage 81 and front tires 88F and rear tires 88R are driven by the drive shaft 87. Reference numeral 90 indicates a fender cover.

Figure 2:
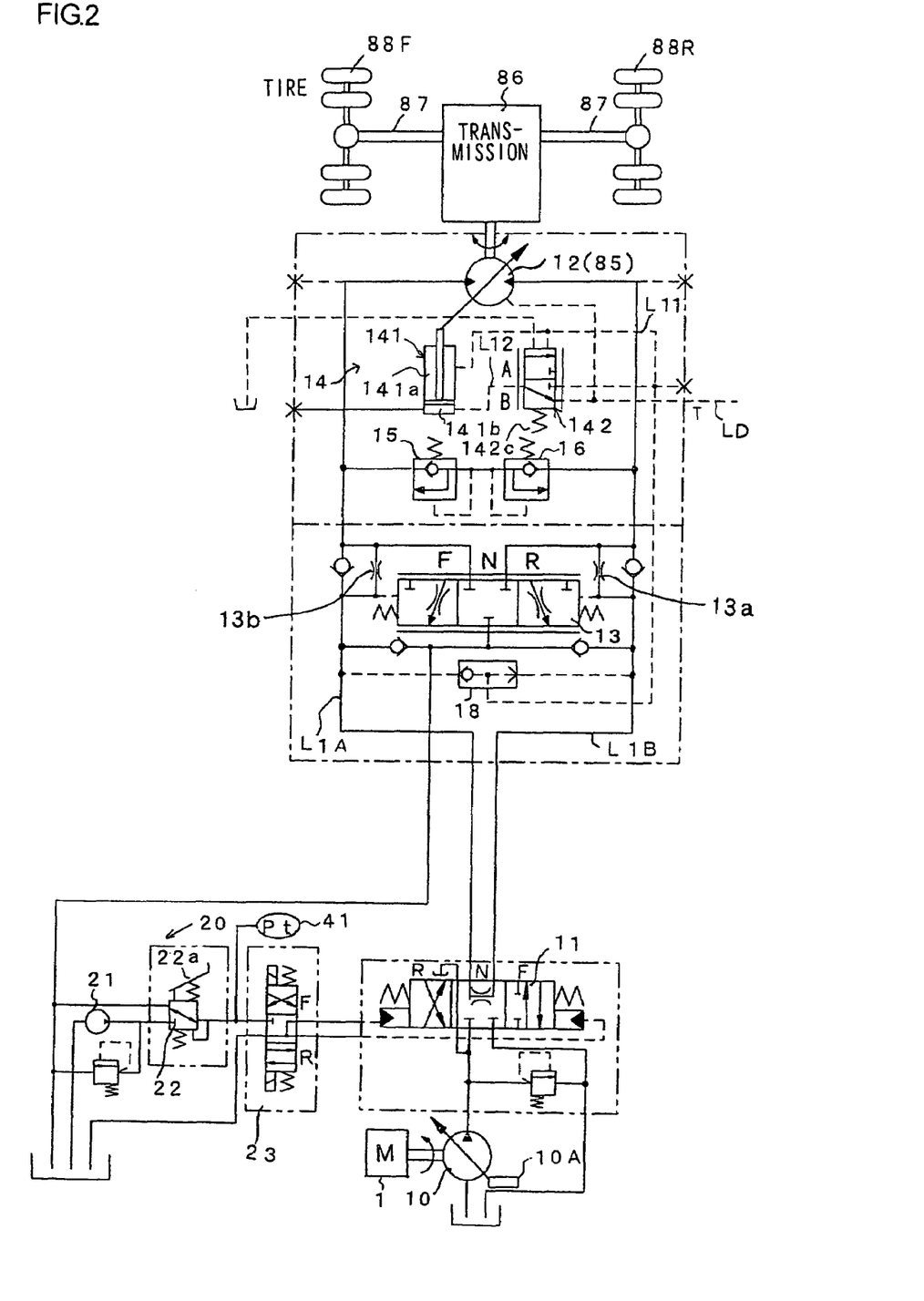
FIG. 2 is a circuit diagram of a traveling hydraulic circuit for the hydraulically driven vehicle achieved in a first embodiment of the present invention.

FIG. 2 shows a traveling hydraulic circuit of the hydraulically driven vehicle achieved in the embodiment of the present invention. The hydraulic circuit includes a variable displacement hydraulic pump 10 driven by an engine 1, a travel control valve 11 that is operated via a pilot hydraulic circuit 20 to control the flow rate and the direction of oil output from the hydraulic pump 10, a traveling variable displacement hydraulic motor 12 (85 in FIG. 1) driven with the pressure oil controlled via the travel control valve 11, a counterbalance valve 13 disposed between the travel control valve 11 and the hydraulic motor 12, a pump regulator 10A that adjusts the displacement of the hydraulic pump 10, a motor regulator 14 that adjusts the displacement of the hydraulic motor 12 and crossover load relief valves 15 and 16 that regulate the maximum pressures in main conduit L1A and L1B connecting the control valve 11 and the hydraulic motor 12.

The counterbalance valve 13 is switched in correspondence to the traveling drive pressure (also referred to as a load pressure) at the hydraulic motor 12. Namely, as the pressure within the main conduit L1A or L1B increases, the counterbalance valve 13 is switched from a neutral position (N position) to an F position or an R position, whereas it is switched to the neutral position as the pressure in the main conduit L1A or L1B decreases. When the counterbalance valve 13 is at the neutral position, the flow of the oil returning from the hydraulic motor 12 is restricted at a restrictor 13a or 13b, which raises the pressure in the return-side conduit L1B or L1A located downstream of the hydraulic motor 12, thereby generating a braking pressure.

The pump regulator 10A includes a torque limiting unit to which the pump delivery pressure (traveling drive pressure) is fed back, thereby enabling horsepower control. The term "horsepower control" is used to refer to so-called P-qp control such as that shown in FIG. 3. Under the horsepower control, the pump displacement angle is controlled so that the load, which is determined in conformance to the pump delivery pressure and the pump displacement angle, does not exceed the engine output. Namely, as the feedback pressure P is guided to the regulator 10A, the pump displacement angle qp is controlled in conformance to the P-qp curve in FIG. 3.

Figure 3:
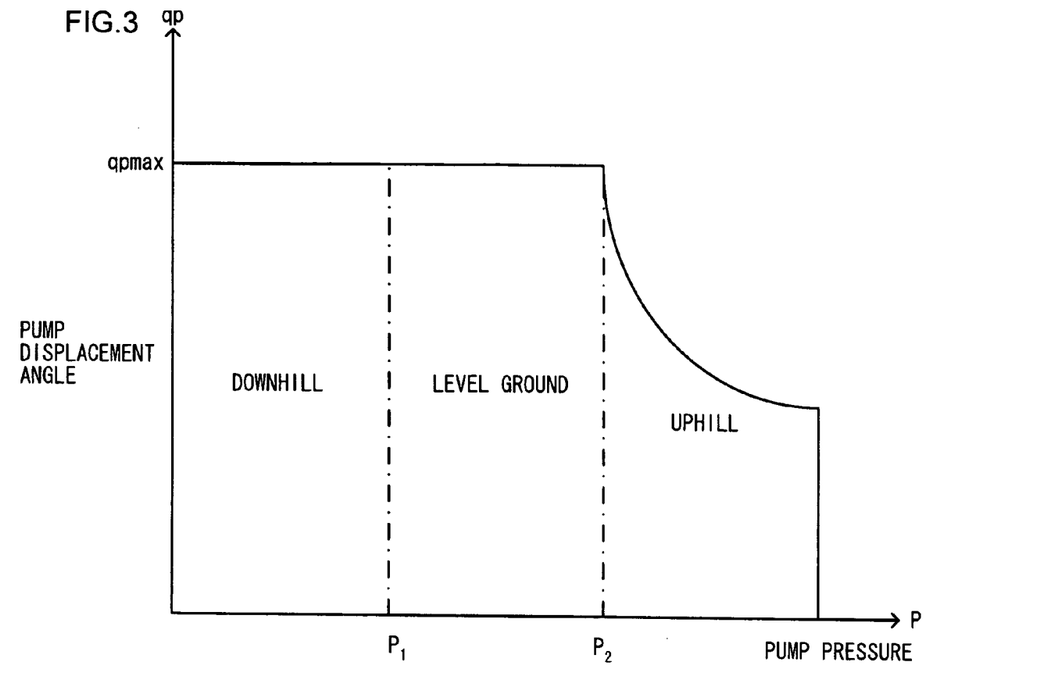
FIG. 3 shows P-qp characteristics of a hydraulic pump in the first embodiment.

In addition, the regulator 10A includes a maximum displacement limiting unit that controls the maximum pump displacement angle so that it does not exceed a predetermined value qpmax. The predetermined value qpmax determines the maximum pump delivery quantity. It is to be noted that the traveling drive pressure P changes in correspondence to the grade of the road surface. FIG. 3 indicates that P≦P1 when the vehicle is traveling downhill, that P>P2 when the vehicle is traveling uphill or is starting to travel and that P1<P≦P2 when the vehicle is traveling on regular level ground. In addition, the maximum pump displacement angle qpmax should be set to a value that does not allow the hydraulic motor 12 to overspeed when the engine 1 is driven at, for instance, a rated rotation speed N1. It is to be noted that the maximum motor speed Nm1 achieved by driving the engine 1 at the rated rotation speed N1 while the vehicle is traveling on a level surface is lower than an allowable rotation speed Nm0 of the hydraulic motor 12. As long as the motor rotation speed remains equal to or lower than the allowable rotation speed Nm0, the service life of the motor 12 is not significantly compromised.

The motor regulator 14 includes a piston 141 and a servo valve 142. A rod chamber 141a in the piston 141 is connected to a shuttle valve 18 which is used to select high pressure oil either in the main conduit L1A or the main conduit L1B via a conduit L11. A bottom chamber 141b of the piston 141 is connected to the servo valve 142 via a conduit L12. The servo valve 142 is switched in correspondence to the traveling drive pressure selected via the shuttle valve 18.

The pilot hydraulic circuit 20 includes a pilot hydraulic pump 21, a traveling pilot valve 22 operated through an accelerator pedal 22a and a forward/reverse switching valve 23 that is switched to a forward position, a reverse position or a neutral position in response to an operation of a forward/reverse selector switch (not shown) The switching direction and the stroke quantity of the control valve 11 are controlled in conformance to the traveling pilot pressure from the pilot hydraulic circuit 20. The traveling pilot pressure is detected by a pressure sensor 41 and is output as a pilot pressure Pt.

The direction and the flow rate of the pressure oil delivered from the hydraulic pump 10 are controlled through the control valve 11, and the controlled pressure oil is supplied to the hydraulic motor 12 via the counterbalance valve 13. The hydraulic motor 12 is thus caused to rotate. The rotation of the hydraulic motor 12 is transmitted to the transmission 86 where the rotational speed is reduced at a predetermined gear ratio and then the decelerated rotation is transmitted to the tires 88F and 88R via the propeller shaft 87. Through this process, the hydraulic excavator is enabled to travel.

FIG. 2 shows the forward/reverse switching valve 23 at the neutral position (N position) and the pilot valve 22 in a non-operating state. In this condition, no pilot pressure is applied to the control valve 11 and the control valve 11 thus remains at the neutral position. Accordingly, the pressure oil from the hydraulic pump 10 is not supplied to the hydraulic motor 12, keeping the vehicle in a stationary state.

The hydraulic circuit in FIG. 2 operates as described below.

As the forward/reverse switching valve 23 is switched to the forward (F) position or the reverse (R) position and the accelerator pedal 22a is depressed, the pilot pressure oil output from the pilot valve 22 travels to a pilot port of the control valve 11, and the control valve 11 is thus switched to the F position or the R position with a stroke, the extent of which corresponds to the pilot pressure. As a result, the pressure oil from the hydraulic pump 10 is delivered to the hydraulic motor 12. At this time, a traveling drive pressure, the level of which corresponds to the load, is generated at the conduit L1A or L1B between the control valve 11 and the counterbalance valve 13, and the traveling drive pressure thus generated switches the counterbalance valve 13 to the F position or the R position. In response to this switchover, the conduit L1B or L1A on the oil-return side becomes open, and the pressure oil from the hydraulic motor 12 flows back to a reservoir via the counterbalance valve 13 and the control valve 11. As the hydraulic motor 12 is thus driven, the vehicle is enabled to travel.

The traveling drive pressure when the vehicle starts traveling is guided as a torque control pressure from the shuttle valve 18 to the regulator 14 via the conduit L11, thereby switching the servo valve 142 to position A. With this switchover at the servo valve 142, the rod chamber 141a and the bottom chamber 141b at the piston 141 come into communication with each other and the torque control pressure is therefore guided to them both. Since the pressure bearing area of the bottom chamber 141b is greater than the pressure bearing area of the rod chamber 141a, the piston 141 extends, which causes an increase in the displacement q of the hydraulic motor 12, allowing the vehicle to travel at low speed and high torque.

As the vehicle travels at a steady speed and thus the traveling drive pressure decreases, the torque control pressure applied to the regulator 14 becomes lower and the servo valve 142 is switched to position B by a spring 142c. With this switchover, the bottom chamber 141b communicates with a drain circuit via a conduit LD, thereby retracting the piston. As a result, the displacement q at the hydraulic motor 12 becomes smaller, allowing the vehicle to travel at high speed and low torque.

Since the vehicle traveling downhill is accelerated by inertial force, the traveling load is reduced during downhill traveling, which switches the counterbalance valve 13 to the neutral position, generating a braking pressure at the conduit L1B or L1A on the oil-return side. In this situation, the switchover at the counterbalance valve 13 occurs with a slight response delay, and for this reason, it takes some time after the vehicle starts traveling downhill until a sufficient level of hydraulic braking force is applied to the hydraulic motor 12.

Figure 4:
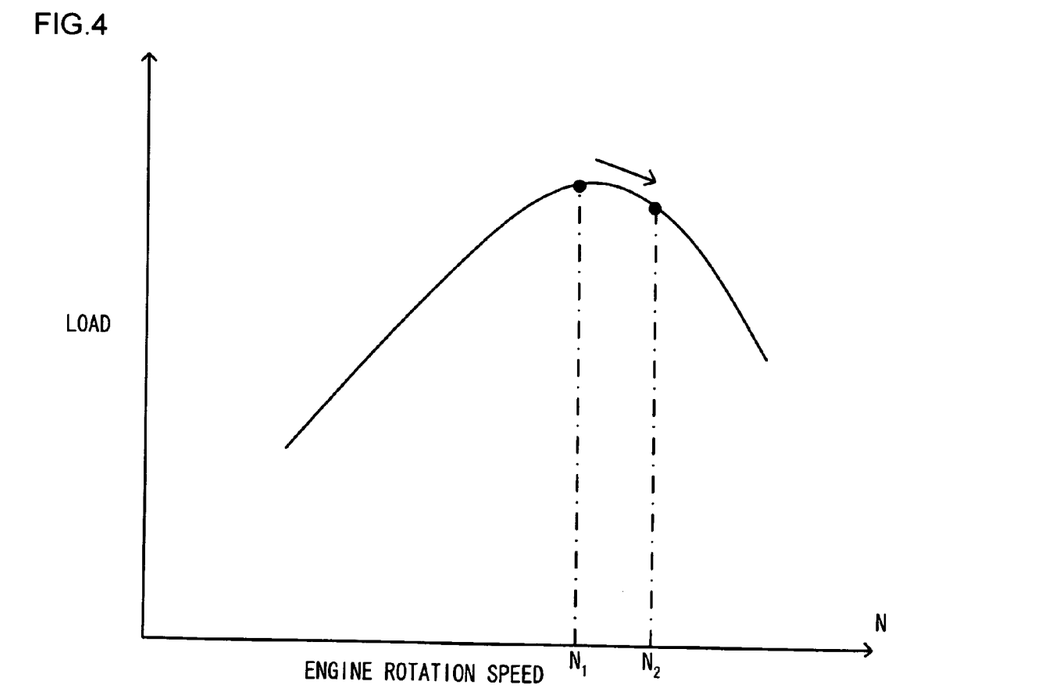
FIG. 4 shows a relationship between a rotation speed and a load at an engine in FIG. 2.

If the engine 1 in the vehicle traveling downhill is driven at the rated rotation speed N1, the engine rotation speed N may increase to exceed the rated rotation speed N1 (N1→N2) due to the decrease in the load, as the engine characteristics in FIG. 4 indicate. If the engine rotation speed N exceeds the rated rotation speed N1, the quantity of oil delivered from the pump, too, exceeds a maximum rated delivery quantity (N1× qpmax). Since the hydraulic braking force is not generated immediately under these circumstances, as explained above, the hydraulic motor 12 may overspeed after the vehicle starts traveling downhill until the operation of the counterbalance valve 13 takes effect. If the motor rotation speed exceeds the allowable rotation speed Nm0 due to overspeed of the motor 12, the service life of the motor is reduced. In order to prevent overspeed of the hydraulic motor 12 attributable to the response delay at the counterbalance valve 13 explained above, the engine rotation speed is controlled as described below in the embodiment.

Figure 5:
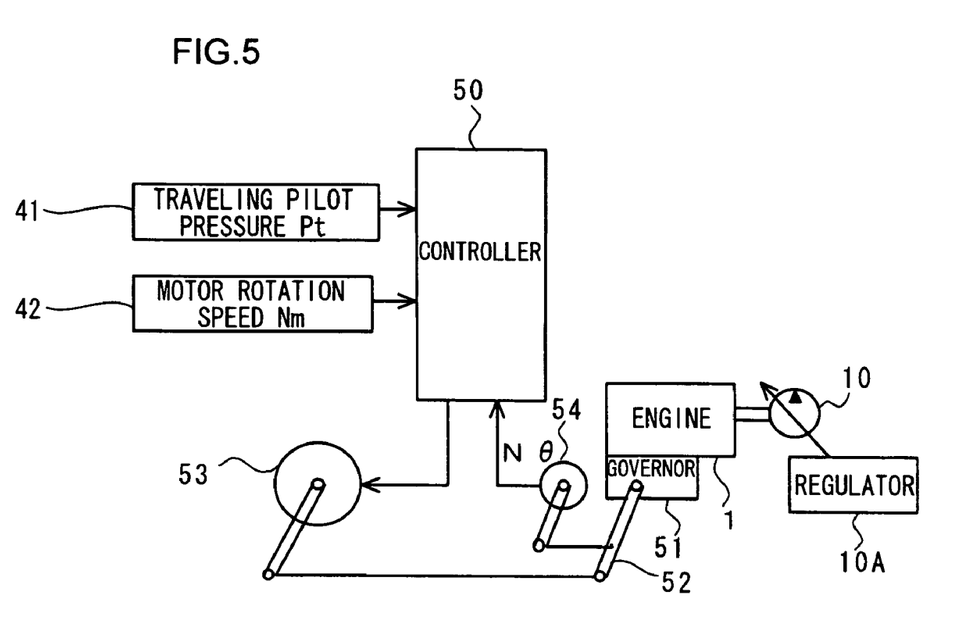
FIG. 5 is a block diagram of a control circuit in a travel control device achieved in the first embodiment.

FIG. 5 is a block diagram of the control circuit that controls the engine rotation speed. A governor 51 of the engine (prime mover) 1 is connected to a pulse motor 53 via a link mechanism 52, and the engine rotation speed is controlled in correspondence to the rotation of the pulse motor 53. Namely, as the pulse motor 53 rotates forward, the engine rotation speed rises, whereas the engine rotation speed falls as the pulse motor rotates in the reverse direction. The rotation of the pulse motor 53 is controlled by a control signal provided by a controller 50 constituted with a CPU and the like. A potentiometer 54 is connected to the governor 51 via the link mechanism 52 and a governor lever angle corresponding to the engine rotation speed, which is detected by the potentiometer 54, is input to the controller 50 as an engine control rotation speed N$\theta$. The pressure sensor 41 that detects the traveling pilot pressure Pt and a rotation speed sensor 42 that detects the motor rotation speed Nm are connected to the controller 50.

Figure 6:
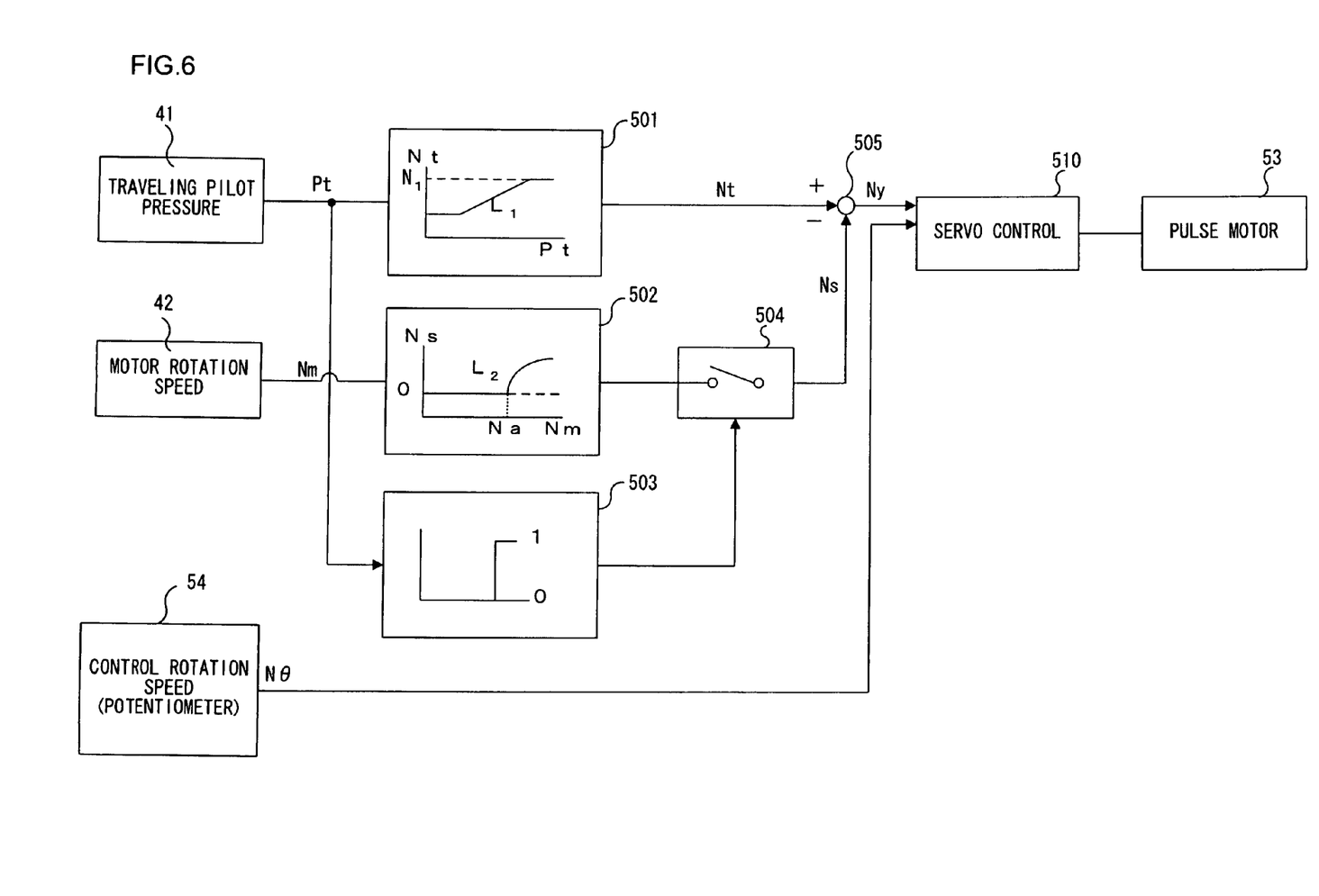
FIG. 6 is a conceptual diagram illustrating in detail a controller in FIG. 5.

FIG. 6 is a detailed block diagram of the controller 50 achieved in the first embodiment. A function generator 501 outputs a target engine rotation speed Nt corresponding to the extent to which the accelerator pedal is depressed, i.e., it outputs a target rotation speed Nt determined in conformance to a function (target rotation speed characteristics) L1 which correlates the traveling pilot pressure Pt detected by the pressure sensor 41 and the target rotation speed for the engine 1. The function L1 indicates that the target rotation speed Nt increases up to the rated rotation speed N1 in proportion to the increase in the pilot pressure Pt.

A function generator 502 outputs a correction engine rotation speed Ns (hereafter referred to as a correction rotation speed Ns) corresponding to the motor rotation speed Nm, i.e., it outputs a correction rotation speed Ns determined in conformance to a function (correction rotation speed characteristics) L2 that correlates the motor rotation speed Nm detected via the rotation speed sensor 42 and the correction rotation speed for the engine 1. The function L2 indicates that when the motor rotation speed Nm is within the range equal to or lower than a predetermined value Na, the correction rotation speed is constant (Ns=0) and that once the motor rotation speed Nm exceeds the predetermined value Na, the correction rotation speed gradually increases as the motor rotation speed becomes higher. A value greater than the maximum speed Nm1 of the motor when the vehicle travels on level ground and smaller than the allowable motor rotation speed Nm0, for instance, should be selected for the predetermined value Na. It is to be noted that since a correlation exists between the motor rotation speed Nm and the vehicle speed, the correction rotation speed Ns may be determined in correspondence to the vehicle speed detected by using a vehicle speed sensor instead of the rotation speed detected by the rotation speed sensor 42.

A function generator 503 outputs a high level signal and closes a switch 504 when the accelerator pedal 22a is operated by an extent equal to or greater than a predetermined value, e.g., when the accelerator pedal 22a is fully depressed. When the switch 504 is closed, a subtractor 505 outputs a value obtained by subtracting the correction rotation speed Ns from the target rotation speed Nt as a target rotation speed command value Ny. When the switch 504 is opened, the subtractor 505 outputs the target rotation speed Nt directly as the target rotation speed command value Ny.

Figure 7:
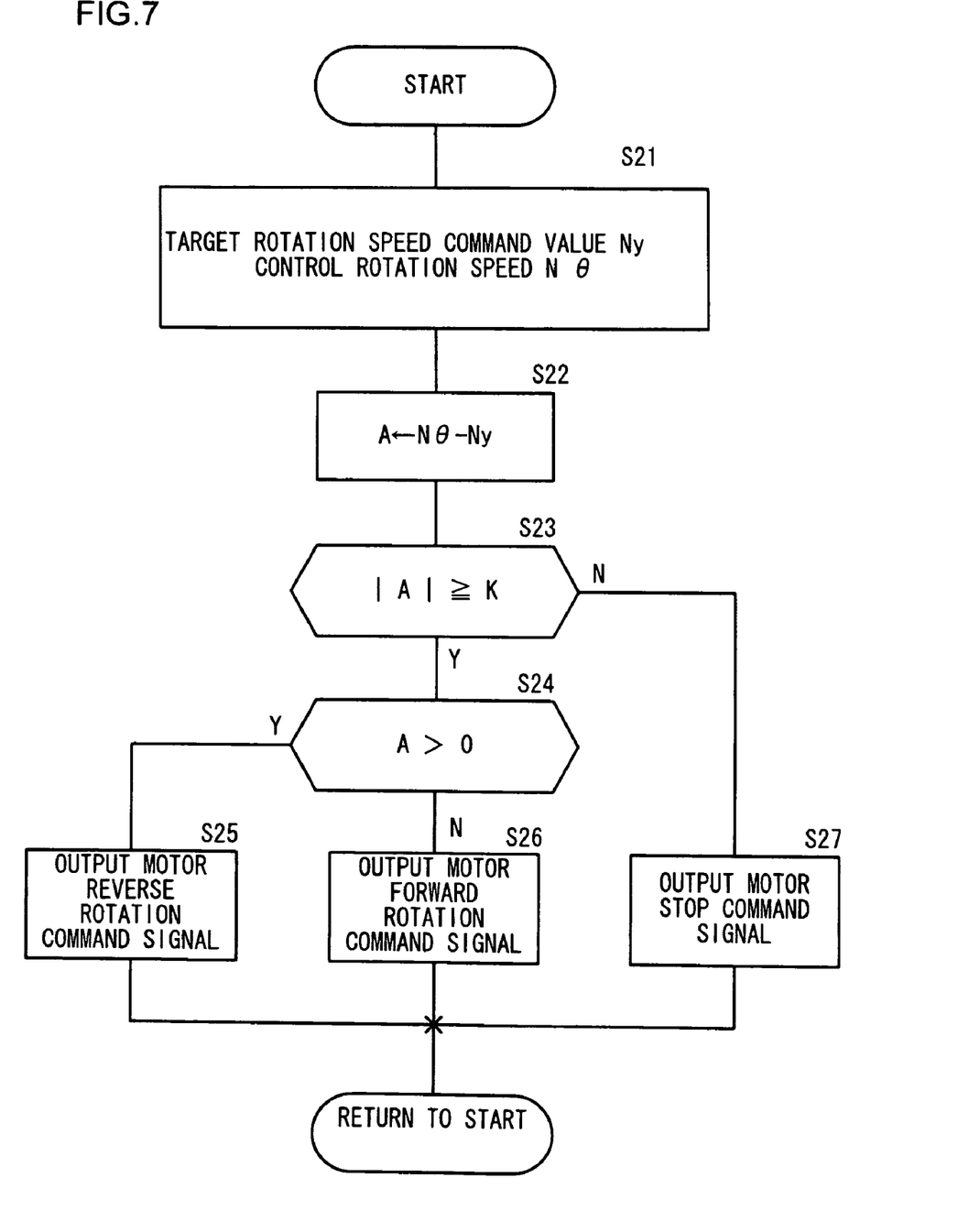
FIG. 7 presents a flowchart of an example of processing that may be executed at a servo control unit in FIG. 6.

A servo control unit 510 compares the target rotation speed command value Ny with a control rotation speed N$\theta$ equivalent to the extent of the displacement of the governor lever detected by the potentiometer 54 and the pulse motor 53 is controlled so as to match them through the procedure shown in FIG. 7.

In step S21 in FIG. 7, the target rotation speed command value Ny and the control rotation speed N$\theta$ are individually read and the operation proceeds to step S22. In step S22, the value obtained by calculating N$\theta$−Ny is stored in memory as a rotation speed difference A and in step S23, a decision is made as to whether or not $|A| \geqq K$ is true with regard to the rotation speed difference A and K representing a predetermined reference rotation speed difference. If an affirmative decision is made, the operation proceeds to step S24 to make a decision as to whether or not the rotation speed difference A is greater than 0. If A>0, the control rotation speed Nθ is greater than the target rotation speed command value Ny, i.e., the control rotation speed is higher than the target rotation speed and accordingly, a motor reverse rotation command signal is output to the pulse motor 53 in order to lower the engine rotation speed in step S25. In response, the pulse motor 53 rotates in the reverse direction, thereby lowering the rotation speed of the engine 1.

If, on the other hand, $A \leqq 0$, the control rotation speed Nθ is smaller than the target rotation speed command value Ny, i.e., the control rotation speed is lower than the target rotation speed and accordingly, a motor forward rotation command signal is output in order to raise the engine rotation speed in step S26. In response, the pulse motor 53 rotates in the forward direction, thereby raising the rotation speed of the engine 1. If a negative decision is made in step S23, the operation proceeds to step S27 to output a motor stop signal and, in response, the rotation speed of the engine 1 is sustained at a constant value. Once the processing in steps S25 through S27 is executed, the operation returns to the start point.

The operation of the travel control device achieved in the first embodiment structured as described above is now explained in further detail.

(1) Level Ground Traveling, Uphill Traveling

The engine rotation speed is equal to or less than the rated rotation speed N1 when the vehicle is traveling on flat, level ground and when the vehicle is traveling uphill. In this condition, the motor rotation speed Nm is equal to or less than the maximum speed Nm1 and is thus smaller than the predetermined value Na (Nm<Na). Accordingly, the correction rotation speed Ns output from the function generator 502 indicates 0 and the target rotation speed Nt output from the function generator 501 is directly output as the target rotation speed command value Ny regardless of whether the switch 504 is open or closed, i.e., regardless of whether or not the accelerator pedal 22a has been fully depressed. As a result, the engine rotation speed is controlled at the rotation speed Nt determined in conformance to the function L1, which corresponds to the extent to which the accelerator pedal 22a is operated.

(2) Downhill Traveling

Figure 8:
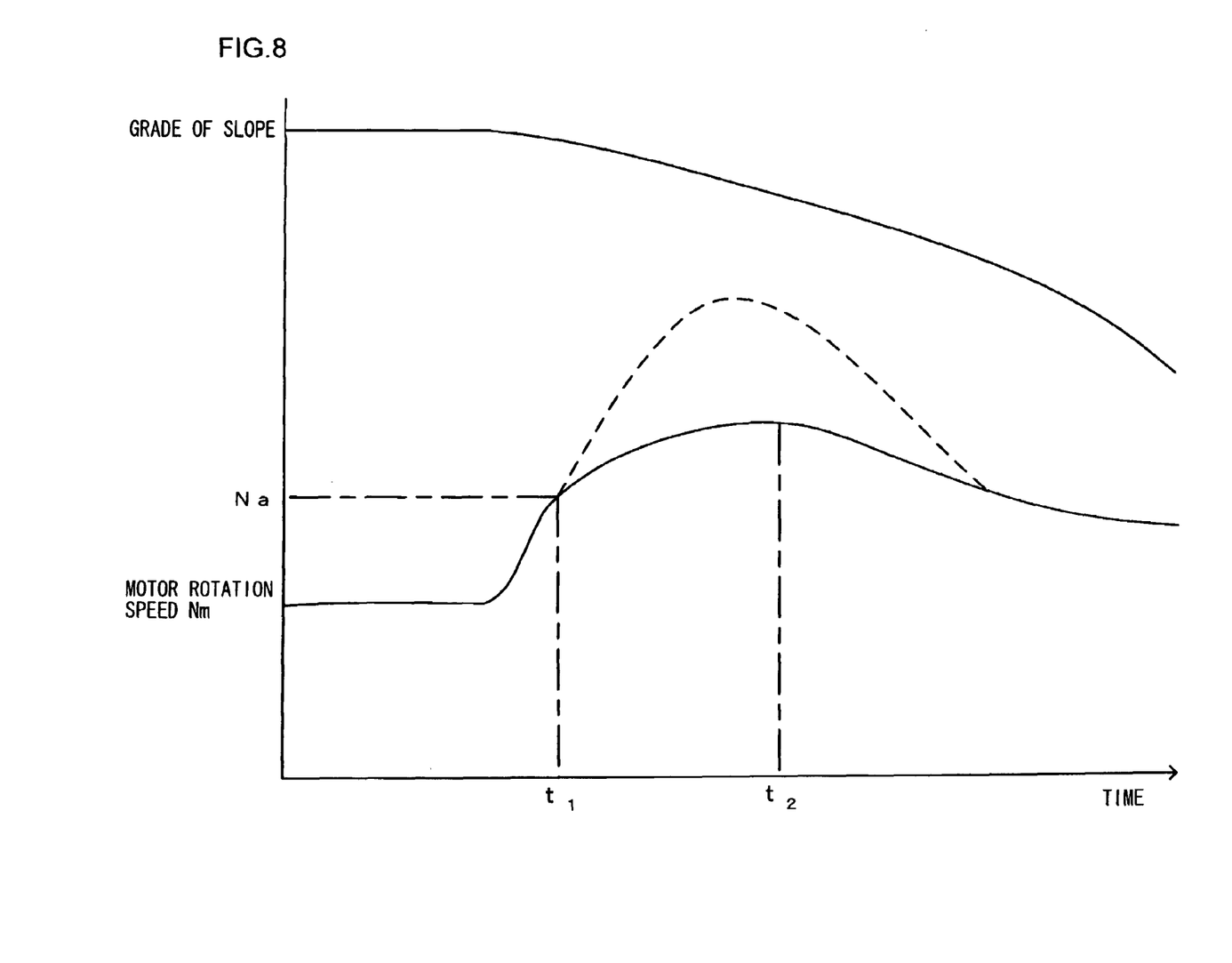
FIG. 8 presents a time chart of an example of an operation that may be executed at the travel control device in the first embodiment.

FIG. 8 shows characteristics of the motor rotation speed Nm corresponding to the inclination (grade) of a downhill slope on which the vehicle travels after it initially traveled on level ground at the maximum motor speed Nm1 by fully depressing the accelerator pedal 22a. It is to be noted that the solid line in the figure indicates the characteristics achieved with the travel control device in the embodiment that controls the engine rotation speed in correspondence to the motor rotation speed, whereas the dotted line in the figure indicates characteristics observed by sustaining the engine rotation speed at a constant level.

When the vehicle starts traveling downhill, the braking pressure does not rise immediately due to the response delay at the counterbalance valve 13 and thus, the vehicle is accelerated by gravitational force, resulting in an increase in the motor rotation speed Nm, as shown in FIG. 8. Once the motor rotation speed Nm exceeds the predetermined value Na (at a time point t1 in FIG. 8), the function generator 502 outputs the correction rotation speed Ns (>0) corresponding to the motor rotation speed Nm, and the value obtained by subtracting the correction rotation speed Ns from the target rotation speed Nt is output as the target rotation speed command value Ny. As a result, the engine rotation speed is controlled so that it becomes lower than the target rotation speed Nt by the correction rotation speed Ns. Thus, the quantity of oil delivered from the pump is kept equal to or less than the maximum rated delivery quantity, which keeps the rotation speed Nm of the hydraulic motor 12 immediately after the vehicle starts traveling downhill smaller than that indicated by the dotted line in FIG. 8. Consequently, the motor rotation speed Nm is sustained at a level equal to or lower than the allowable rotation speed Nm0.

Under these circumstances, the motor rotates faster if the slope has a steeper grade, which increases the motor rotation speed Nm and causes the function generator 502 to output a greater value for the correction rotation speed Ns. Accordingly, the engine rotation speed is reduced by a greater extent as the vehicle is accelerated to a greater extent, thereby effectively preventing overspeed of the hydraulic motor 12.

When a specified length of time has elapsed (until a time point t2 in FIG. 8) following the downhill traveling start, the counterbalance valve 13 is switched to the neutral position and the hydraulic braking force is applied to the motor 12. This reduces the motor rotation speed Nm, which, in turn, reduces the correction rotation speed Ns for the engine 1. As the motor rotation speed Nm is further reduced to a level equal to or less than the predetermined value Na, the correction rotation speed Ns is set to 0. At this point, the motor 12 is no longer in the overspeed state. Subsequently, the engine rotation speed is controlled so as to sustain the target rotation speed Nt and the braking function of the counterbalance valve 13 prevents an increase in the motor rotation speed Nm without having to reduce the engine rotation speed while the vehicle travels downhill.

If the accelerator pedal 22a is not fully depressed while the vehicle travels downhill, the switch 504 is set in an open state and the target rotation speed Nt (<N1) provided by the function generator 501 is output as the target rotation speed command value Ny. Under these circumstances, the target rotation speed Nt is lower than the rated rotation speed N1 and thus, the engine rotation speed is equal to or lower than the rated rotation speed N1. As a result, the quantity of oil delivered from the pump is maintained at a level equal to or less than the maximum rated delivery quantity, which keeps the motor rotation speed Nm equal to or lower than the allowable rotation speed Nm0. Since the engine rotation speed is not corrected unless the pedal 22a is fully depressed, as described above, the engine rotation speed is not reduced unnecessarily, which allows the vehicle to provide good traveling performance. It is to be noted that the output of the function generator 503 may be adjusted so as to close the switch 504 before the accelerator pedal 22a is fully depressed, in order to ensure that the engine rotation speed in the vehicle traveling downhill is reliably set to a level equal to or lower than the rated rotation speed N1.

The following advantages are achieved in the first embodiment described above.

(1) As the motor rotation speed Nm exceeds the predetermined value Na, the motor 12 is detected to be in an overspeed state and in this case, the engine rotation speed command value Ny is reduced to a value smaller than the target rotation speed Nt corresponding to the extent of the pedal operation. As a result, the engine rotation speed is not allowed to exceed the rated rotation speed N1 when the vehicle travels downhill and consequently, overspeed of the traveling motor 12 in excess of the allowable rotation speed Nm0, which might otherwise occur due to the response delay at the counterbalance valve 13, can be prevented.

(2) Once the motor rotation speed Nm is set to a value equal to or less than the predetermined value Na through the braking function of the counterbalance valve 13, i.e., once the motor 12 is no longer in an overspeed state, control is executed for the engine rotation speed to sustain the target rotation speed Nt. Thus, the engine rotation speed is decreased only for a short period of time, minimizing the adverse effect on the traveling performance.

(3) Since the engine rotation speed command value Ny is reduced by closing the switch 504 when the accelerator pedal 22a is engaged in full operation, the engine rotation speed is not decreased unnecessarily, assuring good traveling performance.

(4) The function L2 is defined so as to set a greater correction rotation speed Ns when the motor rotation speed Nm is higher and thus, the engine rotation speed command value Ny is reduced to a greater extent when the motor rotation speed Nm is higher. This means that even when the grade of the slope is significant and the motor rotation speed Nm increases markedly, the motor rotation speed Nm can still be reliably kept to a level equal to or lower than the allowable rotation speed Nm0.

(5) Since the motor rotation speed Nm is directly detected with the rotation speed sensor 42, the motor rotation speed Nm can be accurately detected, which, in turn, improves the accuracy of overspeed prevention control.

Second Embodiment

Figure 9:
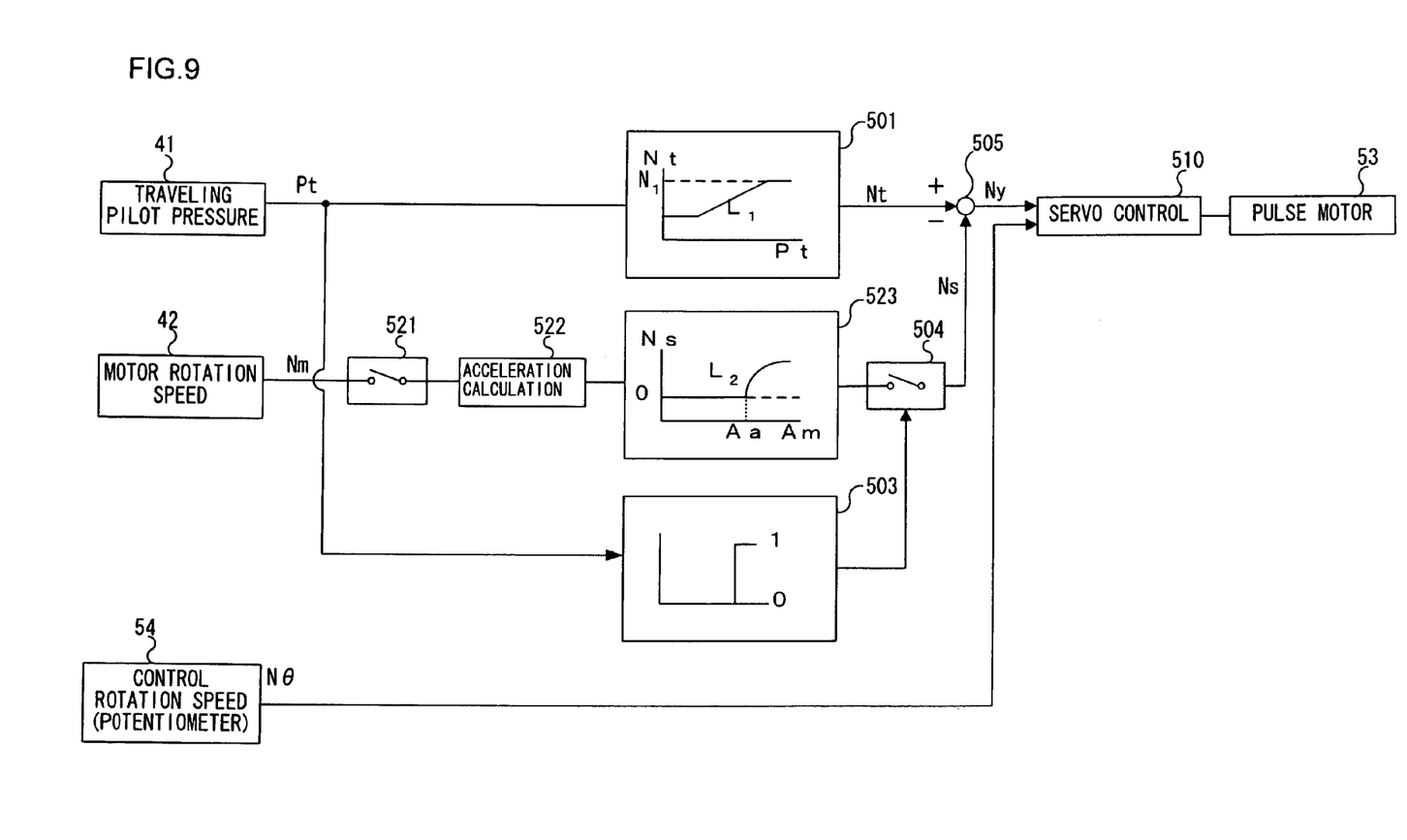
FIG. 9 is a block diagram of the control circuit in the travel control device achieved in a second embodiment.

In reference to FIG. 9, the second embodiment of the travel control device according to the present invention is explained.

While the engine rotation speed is lowered relative to the target rotation speed Nt in correspondence to the motor rotation speed Nm in the first embodiment, the engine rotation speed is reduced in correspondence to the motor acceleration Am in the second embodiment. It is to be noted that the following explanation focuses on features that differentiate the second embodiment from the first embodiment.

The second embodiment differs from the first embodiment in the contents of the processing executed in the controller 50 to prevent overspeed of the motor. FIG. 9 is a detailed block diagram of the controller 50 achieved in the second embodiment. It is to be noted that the same reference numerals are assigned to components identical to those in FIG. 6. The motor rotation speed Nm detected by the rotation speed sensor 42 is input to an acceleration calculation unit 522 via a switch 521. The switch 521 is closed if the motor rotation speed Nm is equal to or higher than the maximum speed Nm1, and is opened if the motor rotation speed Nm is lower than the maximum speed Nm1. When the switch 521 is closed, the acceleration calculation unit 522 executes a time differentiation of the motor rotation speed Nm, thereby determining through calculation the motor acceleration Am.

A function generator 523 outputs a correction rotation speed Ns determined in conformance to a function L2 that correlates the motor acceleration Am to the correction rotation speed for the engine 1. The function L2 indicates that while the motor acceleration Am is within the range equal to or less than a predetermined value Aa, the correction rotation speed remains constant (Ns=0) and that once the motor acceleration Am exceeds the predetermined value Aa, the correction rotation speed gradually increases as the motor rotation speed increases. The predetermined value Aa is a threshold value used to predict whether or not the motor rotation speed Nm is likely to rise to a level exceeding the allowable rotation speed Nm0 before the counterbalance valve 13 is switched. The motor rotation speed Nm is predicted to exceed the allowable rotation speed Nm0 if the motor acceleration Am exceeds the predetermined value Aa. It is to be noted that as the motor acceleration has a correlation to the grade of the slope, similar processing may be executed by using a tilt sensor instead of the motor acceleration.

The operation that characterizes the travel control device achieved in the second embodiment is now explained.

When the motor rotation speed Nm is less than the maximum speed Nm1 during a level ground traveling operation, the switch 521 is set in an open state. At this time, the correction rotation speed Ns is not output, and the engine rotation speed is controlled so as to sustain the target rotation speed Nt corresponding to the extent of the pedal operation. Since the motor rotation speed Nm is low in this case, the motor rotation speed Nm does not exceed the allowable rotation speed Nm0 during the response delay at the counterbalance valve 13 even if the vehicle shifts from the level ground traveling operation to a downhill traveling operation. For this reason, it is not necessary to reduce the engine rotation speed.

If, on the other hand, the vehicle is traveling on level ground at the motor maximum speed Nm1, the switch 521 is set in a closed state and the acceleration calculation unit 522 calculates the motor acceleration Am. If the vehicle shifts from a level ground traveling operation to a downhill traveling operation in this condition, the motor acceleration Am increases in correspondence to the inclination of the slope. If the grade is relatively shallow, the motor acceleration Am does not exceed the predetermined value Aa and thus, the correction rotation speed Ns remains constant at 0. Under these circumstances, the motor rotation speed Nm is not predicted to exceed the allowable rotation speed Nm0 during the response delay at the counterbalance valve 13 and accordingly, the engine rotation speed is not to be decreased. In contrast, if the grade is steep and the motor acceleration Am exceeds the predetermined value Aa, the motor rotation speed Nm is predicted to exceed the allowable rotation speed Nm0 due to overspeed of the motor 12. Accordingly, the correction rotation speed Ns (>0) is output from the function generator 523 and the engine rotation speed is reduced to a level lower than the target rotation speed Nt by the correction rotation speed Ns. As a result, the motor rotation speed is not allowed to exceed the allowable rotation speed Nm0 due to overspeed of the motor 12.

The following advantages are achieved in the second embodiment.

(1) The motor acceleration Am is calculated based upon the motor rotation speed Nm. If the motor acceleration Am exceeds the predetermined value Aa, the motor 12 is detected to be in an overspeed state, thereby predicting that the motor rotation speed Nm is likely to exceed the allowable rotation speed Nm0 and accordingly, reducing the engine rotation speed command value Ny to a level lower than the target rotation speed Nt corresponding to the extent of pedal operation. As a result, it is possible to prevent the motor rotation speed Nm from exceeding the allowable rotation speed Nm0 beforehand.

(2) Even when the motor rotation speed Nm is greater than the predetermined value Na, the engine rotation speed is not lowered if the motor acceleration Am is equal to or less than the predetermined value Aa, and thus, only the minimum level of decelerating force that is absolutely necessary is applied to the vehicle, thereby assuring smooth traveling operation.

(3) The switch 521 is turned on when the motor 12 is rotating at the maximum speed Nm1 so as to control the engine rotation speed in correspondence to the acceleration Am. As a result, the engine rotation speed is not lowered even if the acceleration Am exceeds the predetermined value Aa during a low-speed traveling operation, which assures satisfactory acceleration performance at low speed.

Figure 10:
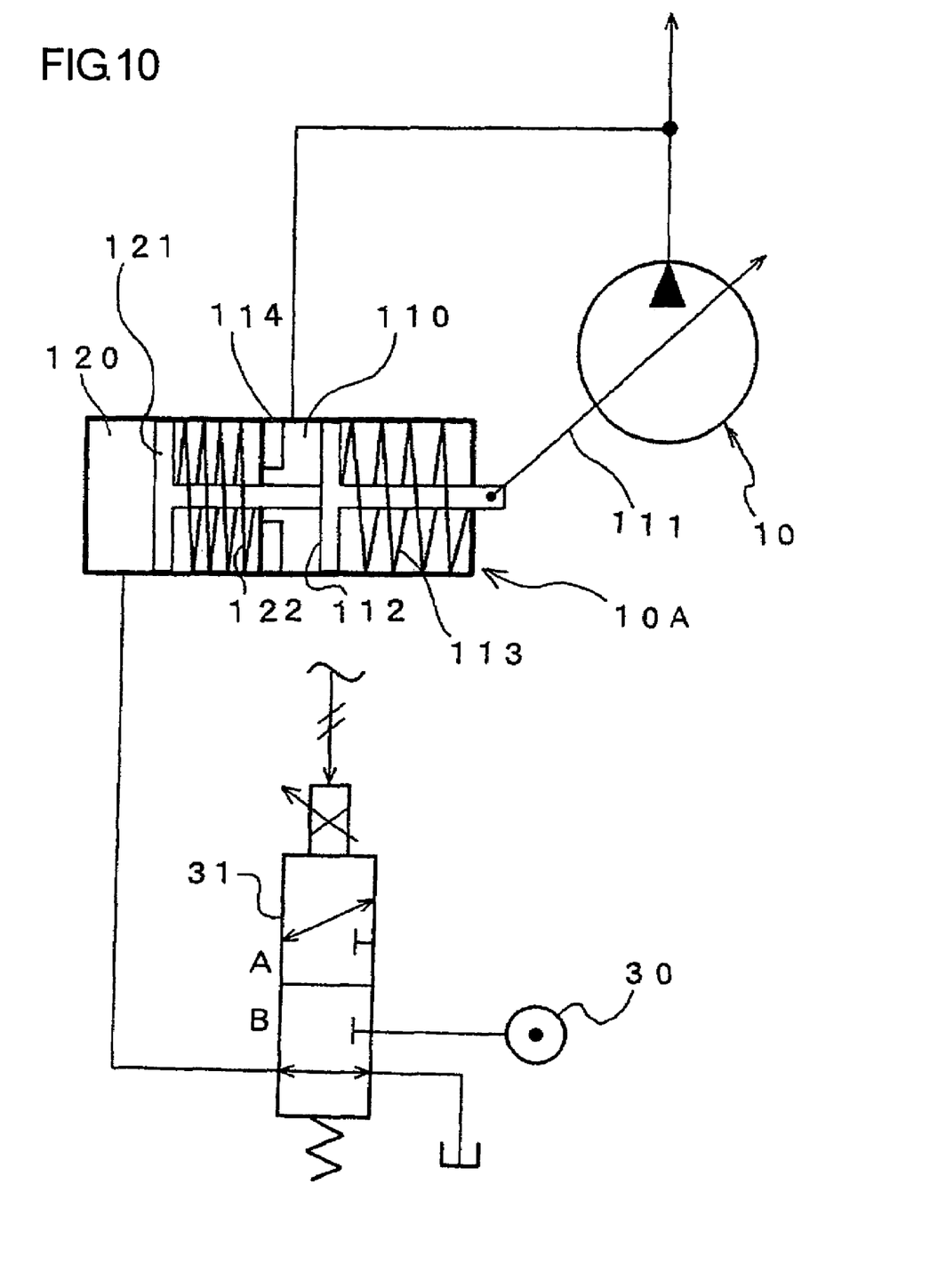
FIG. 10 shows a structure of a hydraulic pump regulator achieved as a variation of the present invention.

It is to be noted that while overspeed of the hydraulic motor 12 is inhibited by lowering the engine rotation speed if the motor rotation speed Nm exceeds the predetermined value Na or if the motor acceleration Am exceeds the predetermined value Aa in the explanation provided above, overspeed of the hydraulic motor 12 may be inhibited by reducing the maximum displacement angle of the hydraulic pump 10, instead. In the latter case, the pump regulator 10A may be structured as shown in FIG. 10, for instance. The following is an explanation of such a pump regulator.

The pump regulator 10A in FIG. 10 includes a torque limiting unit 110 and a maximum displacement control unit 120. A spring 113 that applies a force to a piston 112 linked to a pump swashplate 111 toward a maximum displacement limiting unit 114 is provided in the torque limiting unit 110, and the pump delivery pressure P is fed back to the torque limiting unit 110 thereby enabling the horsepower control explained earlier. Namely, as the feedback pressure P is guided to the torque limiting unit 110, the piston 112 is driven against the spring force and the pump displacement angle qp is reduced as indicated by the P-qp curve in FIG. 3. In the range over which the pump pressure P is equal to or less than P2, the piston 112 is held at the maximum displacement limiting unit 114 by the spring force, and thus, the pump is displaced by the maximum displacement extent qpmax.

A piston 121 is disposed at the maximum displacement control unit 120 in series with the piston 112, and a spring 122 applies a force to the piston 121 along a direction opposite from the piston 112. The maximum displacement control unit 120 is connected to a hydraulic source 30 via a solenoid proportional pressure reducing valve 31, which is switched in response to a control signal provided by the controller 50. Namely, the solenoid proportional pressure reducing valve 31 is switched to position B when the motor rotation speed Nm or the motor acceleration Am is equal to or less than the predetermined value Na or Aa. This allows the maximum displacement control unit 120 to come into communication with the reservoir, thereby achieving the maximum pump displacement angle qpmax.

Figure 11:
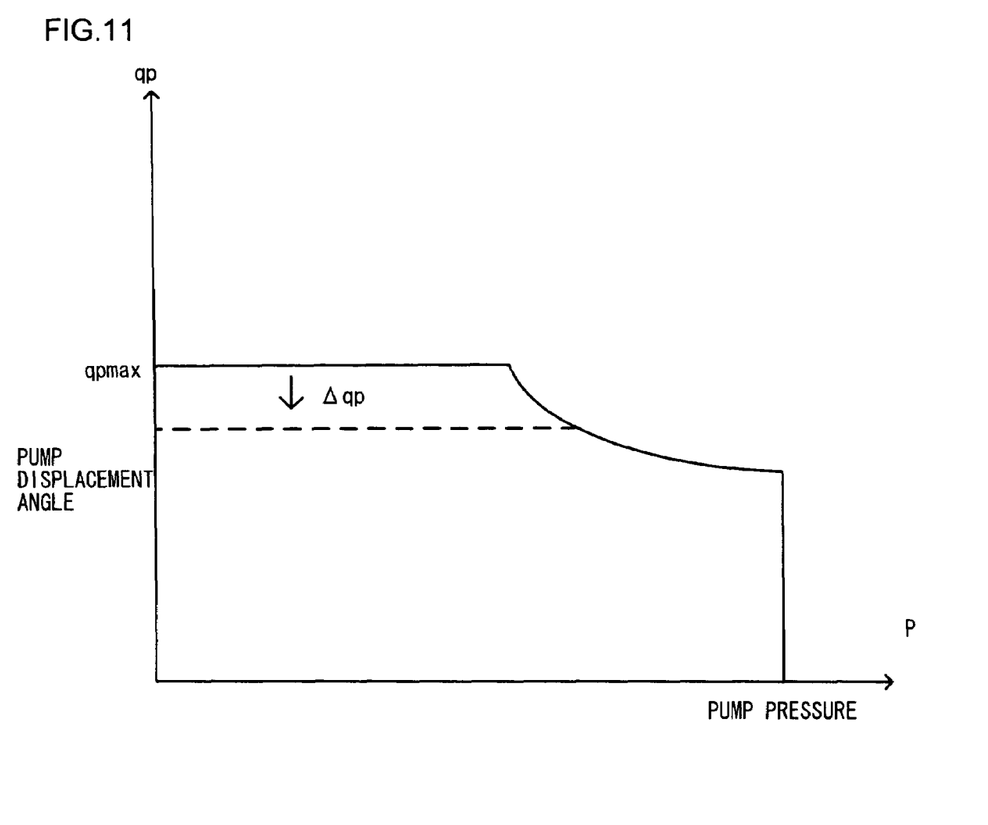
FIG. 11 shows P-qp characteristics of the hydraulic pump in FIG. 10.

If, on the other hand, the motor rotation speed Nm or the motor acceleration Am exceeds the predetermined value Na or the predetermined value Aa, the solenoid proportional pressure reducing valve 31 is switched to position A. As a result, the pressure oil from the hydraulic source 30 is applied to the maximum displacement control unit 120, which causes the piston 121 to move to the right in the figure against the spring force, thereby lowering the upper limit of the range over which the piston 112 is able to move to a smaller value. As a result, the maximum pump displacement angle is reduced from qpmax by a specific extent Δqp as indicated by the dotted line in FIG. 11. In this situation, the extent to which the solenoid proportional pressure reducing valve 31 is switched should be controlled so as to further reduce the maximum pump displacement angle in correspondence to a greater motor rotation speed Nm or a greater motor acceleration Am.

It is to be noted that while overspeed of the traveling motor 12 is inhibited by lowering the engine rotation speed or reducing the maximum pump displacement angle, a motor overspeed inhibiting means other than a prime drive rotation speed reducing means or a pump displacement angle reducing means may instead be utilized. For instance, overspeed of the traveling motor 12 may be inhibited through displacement angle control for the traveling motor 12, drive control for the control valve 11, relief pressure control for the relief valves 15 and 16 or the like. In addition, the switch 504 may be omitted and the correction rotation speed Ns may always be output regardless of the extent to which the accelerator pedal 22a is operated.

The control valve 11 may be engaged in operation via a means other than the accelerator pedal 22a. While the control valve 11 and the engine rotation speed are controlled in correspondence to the extent to which the accelerator pedal 22a is operated (accelerator control) in the example explained above, the control valve 11 alone may be controlled in correspondence to the extent to which the accelerator pedal 22a is operated (valve control). In addition, the hydraulic motor 12 may be a fixed displacement hydraulic motor. The hydraulic pump 10, too, may be a fixed displacement hydraulic pump. While the target rotation speed Nt for the engine 1 is set via the accelerator pedal 22a, it may instead be set via another operation member (e.g., a lever or a switch).

The motor 12 is detected to be in an overspeed state, i.e., a high risk state in which the motor rotation speed Nm may exceed the maximum speed Nm1 to reach the allowable rotation speed Nm0 is detected, when the motor rotation speed Nm exceeds the predetermined value Na or when the motor acceleration Am exceeds the predetermined value Aa in the explanation provided above. Instead, an overspeed state may be detected by using another detection means. Furthermore, while the rotation speed sensor 42 is utilized as the rotation speed detection means, another type of rotation speed detection means may be used instead. Moreover, while the acceleration is determined at the acceleration calculation unit 422 through time differentiation of the signal provided via the rotation speed sensor 42, a different type of acceleration detection means may be used, instead.

INDUSTRIAL APPLICABILITY

The present invention may be adopted in other types of work vehicles that include a counterbalance valve 13 and are driven to travel by a traveling motor 12.

The disclosure of the following priority application is herein incorporated by reference: Japanese Patent Application No. 2003-339859

The invention claimed is:

1. A travel control device for a hydraulically driven vehicle, comprising:
   hydraulic pump driven by a prime mover;
   a target rotation speed command device that issues a command for a target rotation speed of the prime mover;
   a traveling motor driven with pressure oil delivered from the hydraulic pump;
   a control valve for traveling that controls a flow rate of the pressure oil delivered from the hydraulic pump to the traveling motor;
   a counterbalance valve switched in response to a motor load pressure supplied via the control valve, that generates a braking pressure at a conduit disposed on a return side of the traveling motor as the load pressure becomes lower;
   a rotation speed detection device that detects a rotation speed of the traveling motor;
   an overspeed detection device that detects an overspeed state in the traveling motor if the motor rotation speed detected by the rotation speed detection device is equal to or greater than a predetermined value; and a motor overspeed inhibiting device that inhibits rotation of the traveling motor, if the overspeed detection device detects an overspeed state in the traveling motor and a command value issued from the target rotation speed command device is to or greater than a predetermined value, until a braking pressure is generated through a switchover at the counterbalance valve and the traveling motor is no longer in the overspeed state.

2. A travel control device for a hydraulically driven vehicle according to claim 1, wherein:

the motor overspeed inhibiting device is a prime mover rotation speed reducing device that reduces a rotation speed of the prime mover to a greater extent when the detected motor rotation speed is at a higher level.

3. A travel control device for a hydraulically driven vehicle according to claim 1, wherein:

the hydraulic pump is a variable displacement hydraulic pump; and the motor overspeed inhibiting device is a pump displacement angle reducing device that reduces a displacement angle of the hydraulic pump to a greater extent when the detected motor rotation speed is at a higher level.

4. A travel control device for a hydraulically driven vehicle comprising:

a hydraulic pump driven by a prime mover;

a target rotation speed command device that issues a command for a target rotation speed of the prime mover;

a traveling motor driven with pressure oil delivered from the hydraulic pump;

a control valve for traveling that controls a flow rate of the pressure oil delivered from the hydraulic pump to the traveling motor;

a counterbalance valve switched in response to a motor load pressure supplied via the control valve, that generates a braking pressure at a conduit disposed on a return side of the traveling motor as the load pressure becomes lower;

an acceleration detection device that detects an acceleration of the traveling motor;

an overspeed detection device that detects an overspeed state in the traveling motor if the motor speed is equal to or higher than a specific level and the motor acceleration detected by the acceleration detection device is equal to or greater than a predetermined value; and a motor overspeed inhibiting device that inhibits rotation of the traveling motor, if the overspeed detection device detects an overspeed state in the traveling motor and a command value issued from the target rotation speed command device is equal to or greater than a predetermined value, until a braking pressure is generated through a switchover at the counterbalance valve and the traveling motor is no longer in the overspeed state.

5. A travel control device for a hydraulically driven vehicle according to claim 4, wherein:

the motor overspeed inhibiting device is a prime mover rotation speed reducing device that reduces a rotation speed of the prime mover to a greater extent when the detected motor acceleration is at a higher level.

6. A travel control device for a hydraulically driven vehicle according to claim 4, wherein:

the hydraulic pump is a variable displacement hydraulic pump; and the motor overspeed inhibiting device is a pump displacement angle reducing device that reduces a displacement angle of the hydraulic pump to a greater extent when the detected motor acceleration is at a higher level.

7. A hydraulically driven vehicle that comprises a drive control device, wherein:

the travel control device comprises:

a hydraulic pump driven by a prime mover;

a target rotation speed command device that issues a command for a target rotation speed of the prime mover;

a traveling motor driven with pressure oil delivered from the hydraulic pump;

a control valve for traveling that controls a flow rate of the pressure oil delivered from the hydraulic pump to the traveling motor;

a counterbalance valve switched in response to a motor load pressure supplied via the control valve, that generates a braking pressure at a conduit disposed on a return side of the traveling motor as the load pressure becomes lower;

a rotation speed detection device that detects a rotation speed of the traveling motor;

an overspeed detection device that detects an overspeed state in the traveling motor if the motor rotation speed detected by the rotation speed detection device is equal to or greater than a predetermined value; and a motor overspeed inhibiting device that inhibits rotation of the traveling motor, if the overspeed detection device detects an overspeed state in the traveling motor and a command value issued from the target rotation speed command device is equal to or greater than a predetermined value, until a braking pressure is generated through a switchover at the counterbalance valve and the traveling motor is no longer in the overspeed state.

* * * * *